Aug. 8, 1961  C. B. HAUN ET AL  2,995,274
METERING DEVICE

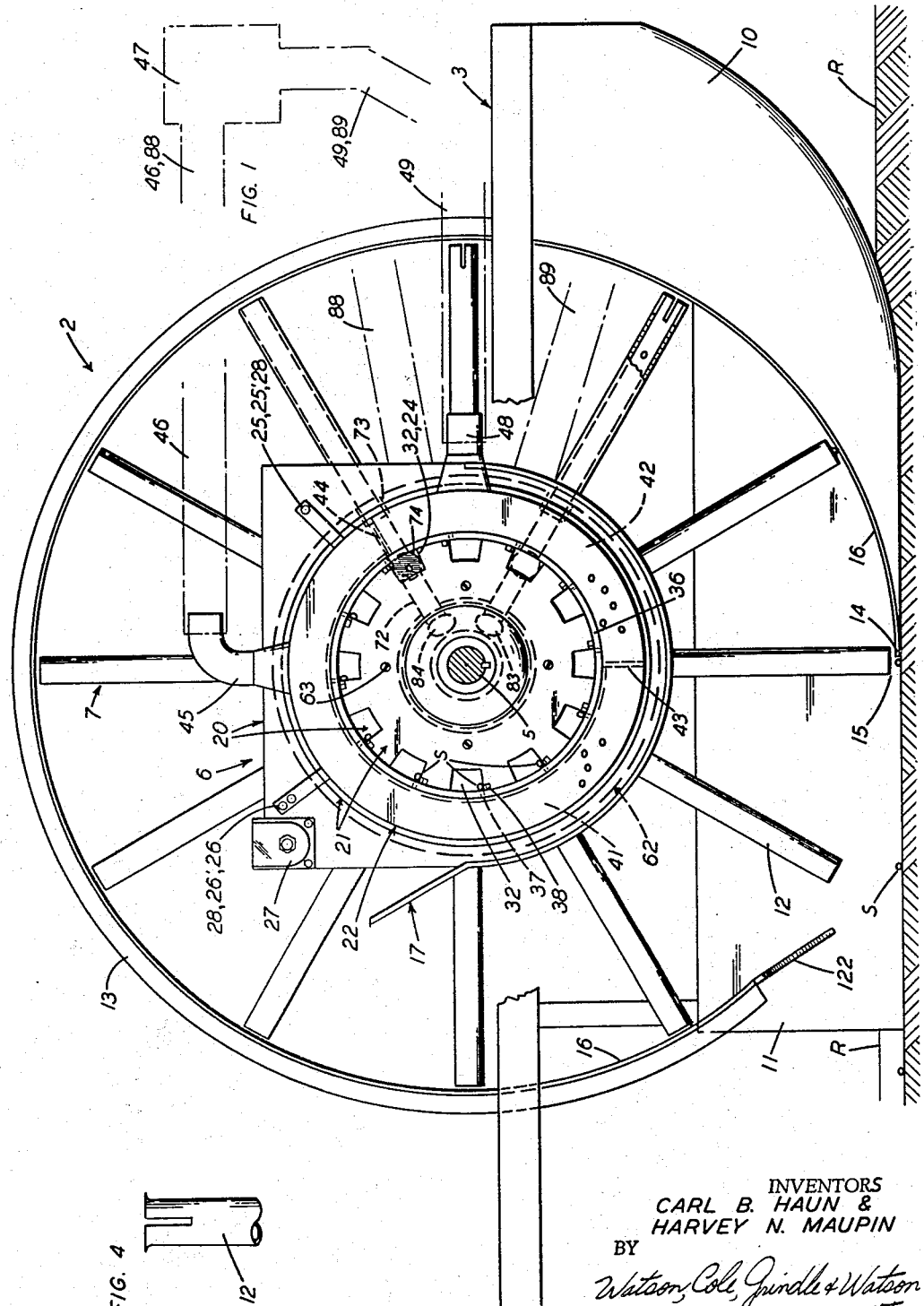

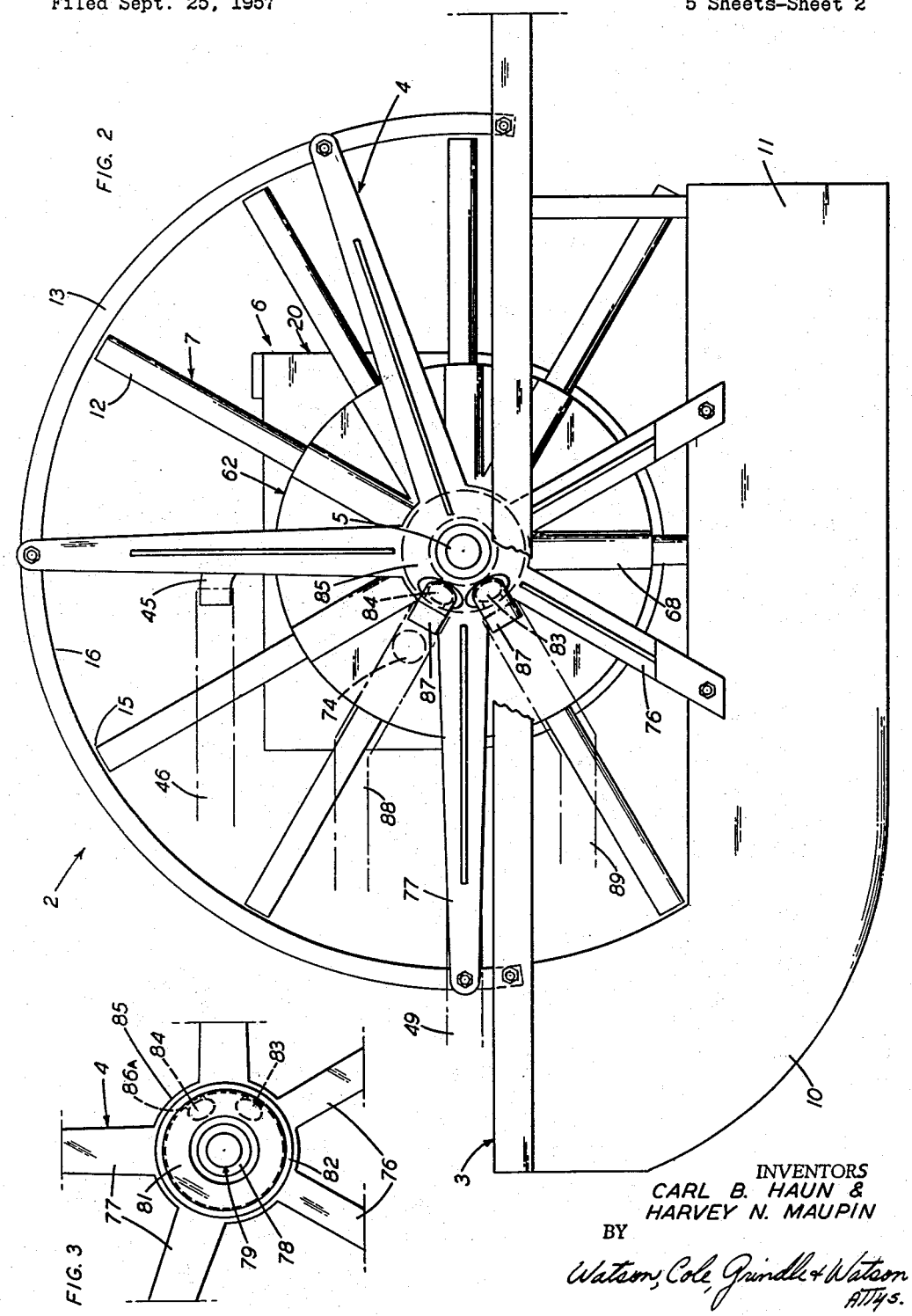

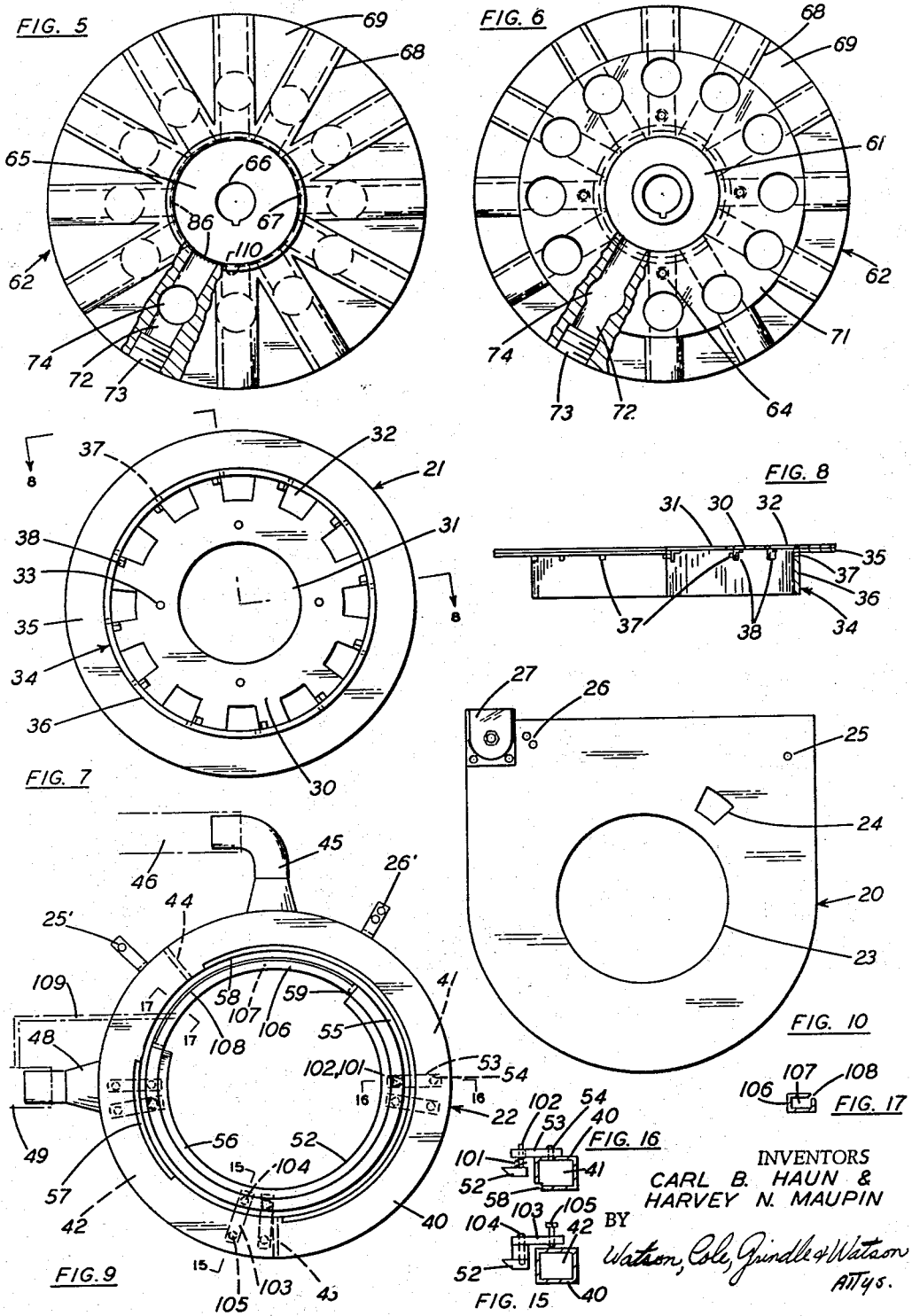

Filed Sept. 25, 1957  5 Sheets-Sheet 4

INVENTORS
CARL B. HAUN &
HARVEY N. MAUPIN
BY
Watson, Cole, Grindle & Watson
ATTYS.

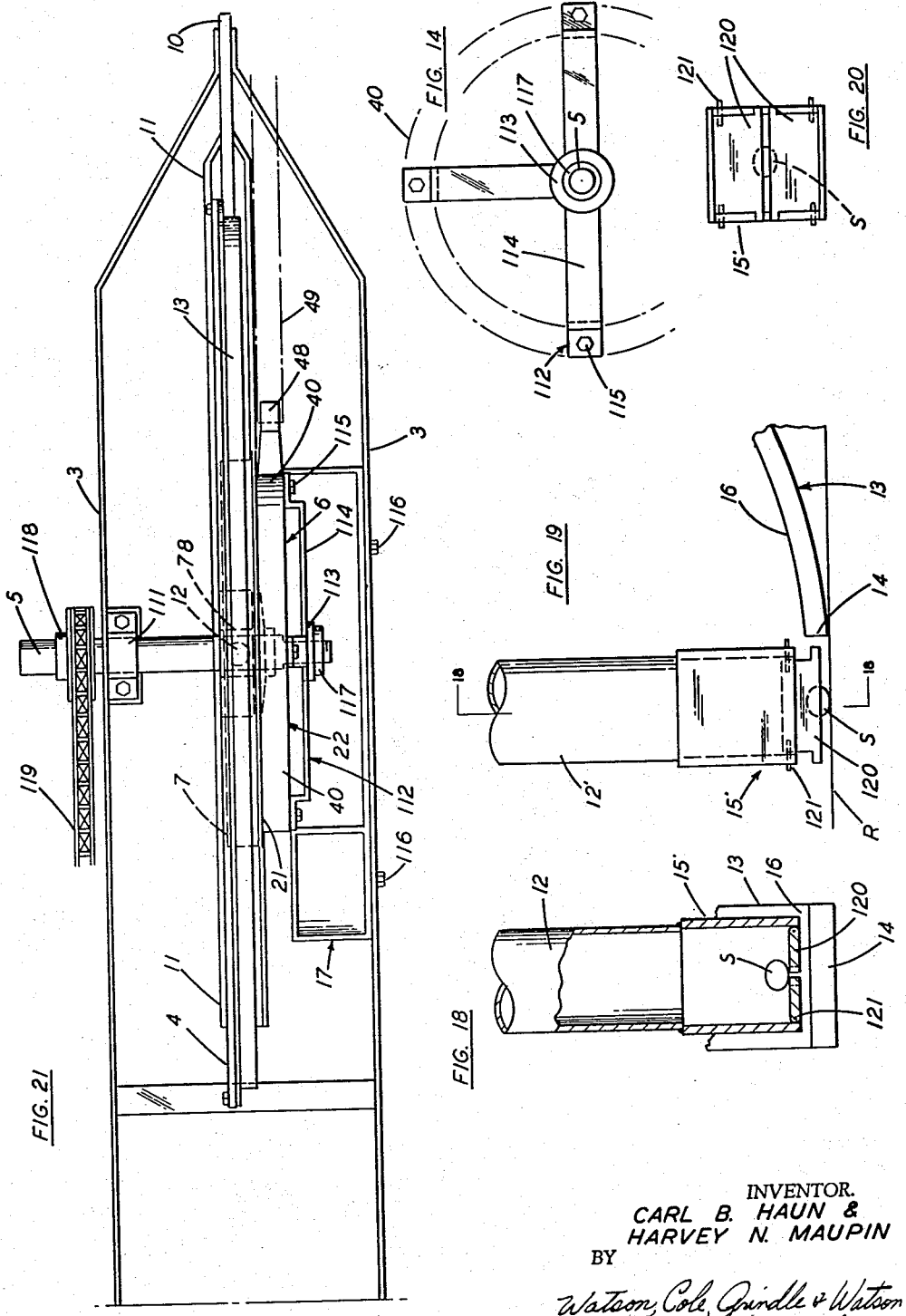

United States Patent Office 2,995,274
Patented Aug. 8, 1961

2,995,274
METERING DEVICE
Carl B. Haun and Harvey N. Maupin, Pine Bluff, Ark., assignors to Ben Pearson, Inc., Pine Bluff, Ark.
Filed Sept. 25, 1957, Ser. No. 686,245
15 Claims. (Cl. 221—211)

This invention relates generally to metering devices and while not being limited to a particular class of equipment has as one purpose of the invention to provide the specific embodiment of a seed metering device for use with agricultural equipment.

Another object of this invention is to provide a metering device wherein single objects may be picked successively from a quantity of similar objects and may be deposited at another location at predetermined spaced intervals.

And another object is to provide a metering device wherein a predetermined quantity of objects may be picked successively from a supply source of similar objects and this quantity may then be deposited with extreme accuracy at a selected location.

A still further object is to provide an air operated metering device which employs a unique holding plate in which the combination of a very small suction hole and a back-up flange will permit only a single object per hole to be picked up and will hold this object securely in place until it reaches a discharge point.

An additional object is to provide a seed metering device which employs a rotating seed plate which securely holds and carries a single seed from its point of pick-up to its point of discharge by sliding contact against a non-rotary plate until a discharge opening in the non-rotary plate is reached.

And yet another object is to provide a unique spoke hub for a seed metering device wherein the hub includes air channeling means to attract and discharge the selected seed and also includes cavity pockets to retain and carry the seed from one location to another.

And another object is to provide a suction operated seed metering device having a rotary seed pick-up plate in sliding contact with a back-up plate which includes a vibrator unit to keep the seed supply agitated for increased efficiency of operation.

An additional object is to provide a stationary suction ring for a pick-up seed metering device having a rotating seed plate for picking up a single seed and including guide means to make this pick-up action more positive.

And still another object is to provide a stationary air ring for a seed metering device having a rotating seed plate in which ring means are provided to both apply suction where needed to pick up the seed and apply pressure where needed to keep the seed supply source and the seed plate clean and free of debris.

And a still further object is to provide a seed metering device wherein a combination of structures is employed to provide an operating cycle in which a single seed is picked up by suction and held against both a rotating and a stationary disk until it reaches a window opening whereupon suction is applied to move the seed laterally into a cavity pocket of a rotating hub in which it rotates to a discharge point whereat pressure is applied to discharge the seed into spokes for accurate placement in crop rows.

And another object is to provide a special spoke adapter metering device for use with tractor drawn farm equipment by means of which a higher degree of precision may be attained in depositing only one or a specific number of seeds in a single seed hill and which precision may be accomplished at a greater speed of tractor travel than is now possible by conventional machines having only a moderate degree of precision.

And a further object is to provide a seed metering planter for agricultural use which will be exceedingly effective and efficient in operation and yet one which will be both rugged and durable in use and economical in construction and maintenance.

And an additional object is to provide a rotary seed metering device which is so constructed as to make it virtually impossible to break or damage the seed in any way during its operation.

And another object is to provide a special spoke adapter unit for use with the regular spoke hub of this invention to provide multiple seed depositing in a single seed hill and to provide a seed hill spacing which differs from the regular spacing.

Earlier seed planters have been used for the purpose of metering seed in a crop row, and probably the device which most closely approaches the present invention is shown in Patent No. 2,783,918 which was issued to John J. Bramblett on March 5, 1957. In the Bramblett planter a small quantity of seed are picked from a hopper by a bucket wheel and are doffed from the bucket wheel scoops by a resilient finger and then fall through an opening into the planter spokes from whence they may fall by gravity or be blown to the outer rim of the planter to be revolved along the rim by the spoke until they reach the end whereat they fall the very short remaining distance to the ground for planting. However, this prior device was not developed to handle one and only one seed or a similar specific number but merely to handle a small quantity of seed. It has been the practice for hundreds of years of farming to plant a handful of seed in a single seed hill or crop row location where actually one or two plants were desired or could efficiently germinate and mature. The theory behind this practice was that not all of the seed planted would germinate and it was better to have too many plants than none at all, but this also meant that many hours of tedious labor would be required to thin out the excess plants so that the remaining plants would be able to bear healthy full size fruit. And it will be obvious that this practice will be a waste of seed, although this was of no particular concern where low cost seed was used. Today there have been developed many hybrid seed which have virtually no failures in germination, and as might be expected these seed are much more expensive than the ordinary variety. As an example of this cost, the saving effected by accurate placement of seed may exceed $4.00 an acre; and of course the labor cost to thin out the excess plants would greatly exceed this figure.

These and other objects and advantages will be apparent from an examination of the following specification and drawings in which:

FIGURE 1 is a right side elevational view of the seed metering planter of this invention shown partly in fragmentary cross-section and partly in cut-away views for clarity of illustration of its construction and function.

FIGURE 2 is a left side elevational view of the device shown in FIGURE 1.

FIGURE 3 is a fragmentary detail left side view of the spider structure which supports the metering equipment from the main frame of the planter.

FIGURE 4 is a fragmentary elevational view of one spoke.

FIGURE 5 is a left side view of the spoke hub detached from the assembly.

FIGURE 6 is a right side view of the spoke hub of FIGURE 5.

FIGURE 7 is a right side view of the seed plate detached from the assembly.

FIGURE 8 is a cross-sectional view taken along the lines 8—8 of FIGURE 7.

FIGURE 9 is a left side detail view of the suction ring of this invention, showing the unique seed loading ring in its operational position.

FIGURE 10 is a right side detail view of the vibrating back-up plate of this invention.

FIGURE 14 is a detail view of the air ring support yoke of FIGURE 21.

FIGURE 15 is a cross-sectional view taken along the lines 15—15 of FIGURE 9.

FIGURE 16 is a cross-sectional view taken along the lines 16—16 of FIGURE 9.

FIGURE 17 is a cross-sectional view taken along the lines 17—17 of FIGURE 9.

FIGURE 18 is a detail front end elevational view partly in cross section (similar to lines 18—18 of FIGURE 19), of a modified embodiment of the spoke tip shown in its closed position.

FIGURE 19 is a side elevational view of the spoke tip of FIGURE 18 shown in its open position.

FIGURE 20 is a bottom view of the device of FIGURE 18.

FIGURE 21 is a top plan view of the device shown in FIGURES 1 and 2.

Figure 11:
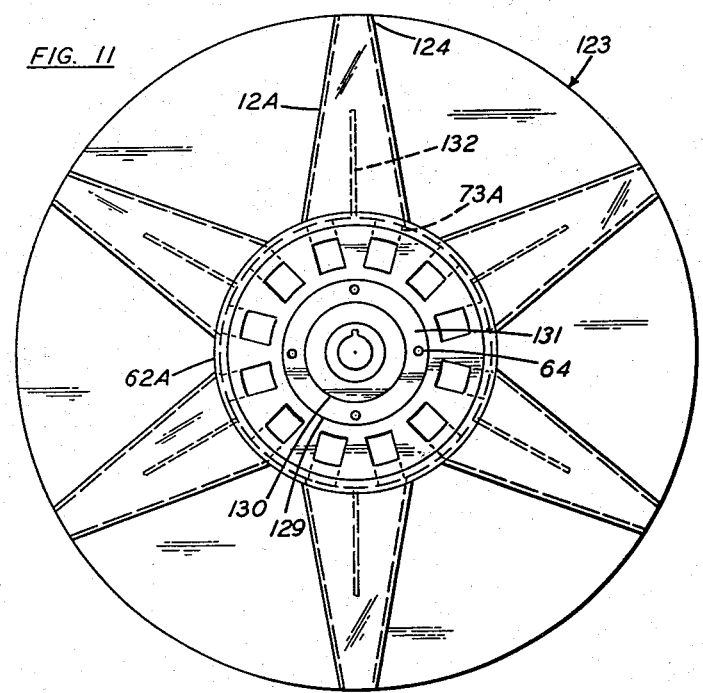
FIGURE 11 is a fragmentary side view showing the spoke hub of FIGURES 1 and 2 used with a special spoke adapter which is employed to change the quantity and spacing of the seed dropped in the seed row.

Referring now more particularly to the characters of reference on the drawing it will be observed that the metering seed planter of this invention indicated generally at 2 consists basically of a planter frame 3, a spider 4 which is attached to and supported from the frame 3, and through which rotary shaft 5 extends, and a metering plate assembly 6 which cooperates with a spoke wheel 7 to deliver a precise and specific quantity of seed S in the crop row R at accurately spaced locations.

The planter frame 3 includes a forwardly pointing sword structure 10 to which are attached two rearwardly extending side plates 11 which are spaced apart at a sufficient distance to permit the spokes 12 of a spoke wheel 7 to freely rotate therebetween. A circular rim 13 attaches to the frame 3 at a point between plates 11 and to the rear of sword structure 10 and surrounds the periphery of spoke wheel 7 for a substantial distance and terminates at one end 14 which is substantially vertically below the shaft 5. The distance between the outer end 15 of spokes 12 and the inner surface 16 of rim 13 is so slight that even a small seed S cannot escape or become wedged therebetween.

A sufficient space is provided between the metering plate assembly 6 and the adjacent frame member 3 to permit the insertion of an auxiliary seed hopper 17. This hopper 17 is supplied from a large hopper (not shown) in a well known manner, and its limits are defined at its inner end by back-up plate 20 which is an integral part of the metering plate assembly 6.

The metering plate assembly 6 actually comprises the stationary back-up plate 20, the rotary seed plate 21 which maintains sliding contact therewith and a stationary air ring 22 which also is slideably engaged by seed plate 21 and is rigidly attached to back-up plate 20. The details of construction of the plate 20 may be seen in FIGURE 10 to be simply a single flat sheet of metal having a central opening 23 and a much smaller sector-shaped opening 24 at the upper right of opening 23. A series of mounting holes 25 and 26 on this plate are positioned so as to be in alignment with a corresponding set of mounting holes 25' and 26' on air ring 22 to receive attaching screws 28. At the upper left hand corner of plate 20 there has been included an electrically operated vibrator unit 27 which is rigidly attached thereto for purposes to be described hereinafter. The rotary seed plate 21 is seen in FIGURES 7 and 8 to be made from two thin sheet metal pieces and then spot welded or otherwise permanently attached together. One such metal sheet is in the form of a flat circular disk 30 which includes a large circular cutout 31 in the center and a plurality of equally spaced semi-sector shaped cutouts 32 which are all located at the same radial distance from the center of the disk 30. Disk 30 also includes a plurality of small mounting holes 33 located in close proximity to the circumference of cutout 31. The second such metal sheet is formed into a hat-ring 34 which includes a flat annular section 35 and a ring section 36 at right angles thereto. The flat section 35 coincides with the circumferential area of disk 30 and the two sheets are welded together in this area. The ring section 36 includes a plurality of small circular air ports 37 for single seed or elongated slots for multiple seed which are aligned with the counterclockwise edge of cutouts 32 when disk 30 and hat-ring 34 are joined. To complete the assembly of rotary seed plate 21, a plurality of small angles are welded or otherwise attached to disk 30 in alignment with ports 37 and in snug relationship to the inner circumference of ring 36 to form the seed stops 38.

The stationary air ring 22 is seen in FIGURE 9 to be composed of a hollow annular ring 40 having a depth corresponding to the height of ring 36 and having an inner circumference corresponding to the outer circumference of ring 36 so that these two members will have a close fitting but sliding contact when joined to form the metering seed plate assembly. The hollow interior of ring 40 is divided into two working sections, i.e. the suction area 41 and the pressure area 42 by the stops 43 and 44 respectively which close off the interior at their locations. Suction area 41 is in direct communication with air fitting 45 which in turn connects with the suction hose 46 from air pump or blower 47, while the pressure area 42 is in direct communication with air fitting 48 which in turn connects with the pressure hose 49 from blower 47. A circular shaped seed loading ring 52 is suspended into the area enclosed by ring 40 in concentric relation therewith by the supporting straps 53 which attach to the outboard sides of air ring 40 by screws 54. The strap 53 is then resiliently attached to ring 52 by a compression spring 101 which surrounds pin 102 and operates between strap 53 and ring 52. Thus when an extra large seed passes under ring 52 or when two seeds become wedged together under it, the spring 101 will permit ring 52 to raise momentarily while such condition exists. A second strap 103 is installed adjacent strap 53 and is rigidly attached to loading ring 52 by screw 104 and has contact with the outboard side of air ring 40 by means of an adjustable set screw 105 to control the initial spacing of ring 52 above seed plate 21 and the compression of spring 101. The annular separation space 55 between air ring 40 and loading ring 52 is sufficient to permit ring 36 to be inserted therebetween and the adjustable depth to which ring 52 extends into the inside circumference of ring 36 is not sufficient to interfere with the free rotation of angle stops 38. Since the ring 52 is spring loaded it will not break the seed if they become wedged therein. Ring 52 includes a chamfer 56 on its inboard side to permit the seed S to readily fall into alignment with the rotating seed stop 38 and the seed holding ports 37 when the planter is in operation. The loading ring 52 is formed of a solid trapezoid shaped cross section including the tapered portion 56 for a substantial percentage of its circumference and for the balance of its circumference the ring 52 is formed of a square tubing section 106 having an internal air cavity 107. A small circumferential slot 108 opens into cavity 107 and extends around the upper edge of tubing 106 and substantially aligns with the suction ports 37 of the seed plate 21 when the latter is rotating past the slot. Cavity 107 is connected to the air pressure supply by a small hose connection 109, and this air pressure is directed through the slot 108 toward the air ports 37 so that any seed over the air ports 37 will be held there by a greater differential pressure than would be possible by the suction in air ring section 41 acting against atmospheric pressure through suction slot 58 which is in communication with air ports 37. Additionally, since the air emerging from slot 108 is directed toward port 37 and is following the inside perimeter of hat ring 34 (FIGURE 8) any seeds that are being held by the vacuum and not in direct contact with the port 37 will drop off, as port 37 is getting all of its air from the place of least resistance which is a stream of air coming out of slot 108; this is particularly true due to the fact that the inside perimeter of hat ring 34 is at its highest point during this particular operation and gravity acting on the seed will overcome any slight suction still maintained by port 37. The loading ring 52 will keep the seeds S lined up with the stops 38 until one seed is held by suction port 37 and when the seed plate 21 has rotated past the top end 59 of the chamfer 56, the unselected seed will drop due to gravity and pressure from slot 108 back into the hopper 17, and after the selected seed has been deposited for discharge, the ports 37 and stops 38 then pass by pressure slot 57 where they are thoroughly cleaned by air pressure to prevent any loss of efficiency in the planting operating due to trash or debris which might become stuck in port 37 and block its use.

At assembly, the offset land 61 (FIGURE 6) of spoke hub 62 of spoke wheel 7 is inserted through the large central opening 23 and the smaller opening 31 of both back-up plate 20 and seed plate 21 respectively. This land 61 is offset a slightly larger dimension than the combined thicknesses of back-up plate 20 and seed plate 21, so that the two plates will be permitted relative sliding movement therebetween, and at the same time maintain accurate axial alignment. Mounting bolts 63 are then passed through bolt openings 33 and central opening 23 and threadedly engaged in tapped holes 64 of hub 62 to thus secure the seed plate 21 and hub 62 into joined co-rotating relation, but permitting plate 20 to remain stationary while maintaining sliding contact with both seed plate 21 and hub 62. The hub 62 itself is an integrally cast circular member having a moderately large central counterbore 65 having a keyed shaft opening 66 extending therethrough. On the outboard side (FIGURE 5), the counterbore 65 is surrounded by a ridge 67 from which a plurality of spoke fittings 68 radiate. For purposes of construction, the spoke fittings 68 are interconnected by a web 69 which is enlarged on the inboard side (FIGURE 6) to provide a flat machined face 71 which will provide a sliding contact area for the adjacent side of back-up plate 20. The fittings 68 include radial channel 72 extending from the periphery of hub 62 into its open center counterbore 65; the outer end of channel 72 being threaded at 73 to receive the threaded spokes 12 to complete the assembly of the spoke wheel 7. Intermediate of the length of channel 72 there is a transversely bored cavity or pocket 74, which at assembly will line up radially with both cutouts 32 of seed plate 21 and with opening 24 of back-up plate 20.

The spider 4 is supported from the planter frame 3 by certain of its arms 76, and itself supports the rim 13 by certain other of its arms 77. At its center, spider 4 supports a bearing 78 having a central opening 79 through which rotary shaft 5 extends. On the inboard side (FIGURE 3), spider 4 includes a raised ring 81 having an outer diameter which engages the inner diameter of counterbore 65 in hub 62 so that the latter may freely rotate about the ring 81. The face of ridge 67 is adapted to engage a machined land 82 surrounding ring 81 to locate the hub 62 and spoke wheel 7 axially on shaft 5 and thus insure that spokes 12 will travel between the laterally spaced side plates 11 and in alignment with rim 13. Ring 81 includes a pair of laterally extending cavities 83 and 84 which both open through plate 85 to the outboard side of spider 4 and both open to the periphery of ring 81 but are not in communication with each other. To prevent the air suction in hose 88 from drawing seed into cavity 84, a mesh ring 86 is inserted between the outside diameter of spider ring 81 and the inside diameter of counterbore 65 of hub 62 by being rigidly fastened into a recess 110 (FIGURE 5) under the ridge 67 and opening into counterbore 65. Air hose fittings 87 connect the suction hose 88 and the pressure hose 89 to their respective cavity openings on plate 85. If the mesh ring picks up any debris during the suction half of its operation when it overlays cavity 84, this debris will be blown out when hub 62 has rotated sufficiently for this section of the mesh to overlay pressure cavity 83. FIGURE 3 shows an alternate location for mesh ring 86. In this alternate arrangement the mesh ring 86 is recessed into the periphery of ring 81 and this installation is indicated by the numeral 86a.

Suction line 88 establishes a suction through cavity 84 and the particular channel 72 which is then in registry with cavity 84, a particular opening 32 of rotating seed plate 21 being at the same time aligned with the opening 24 of stationary plate 20. This suction draws seed S from port 37 of seed plate 21, through openings 32 and 24 into pocket 74 of channel 72. After this particular channel 72 has passed opening 24 and cavity 84 the suction ceases therein but the seed is carried until this same channel 72 aligns with pressure cavity 83, at which time the seed S is blown radially down the spoke 12, all as shown in FIG. 1.

By reference to FIGURE 21, the shaft 5 is seen to be supported at one end by a pillow block bearing 111 mounted on frame 3 and at its other end in bearing 78 of spider 4. In order to insure accurate and concentric positioning of the air ring 40 relative to the seed plate 21 and shaft 5, there is provided a centering yoke 112 having a bearing hub 113 for shaft 5 and three radial arms 114 attached by screws 115 to air ring 40. The auxiliary seed hopper 17 is then attached between the air ring 22 and the frame 3 is a quickly detachable manner by bolts 116 so that by removing the hopper 17, the lock ring 117, yoke 112 and screws 63 and 28 (FIGURE 1), the one-piece rotary seed plate 21 may be quickly and conveniently replaced by a seed plate having a different type or quantity of air ports 37 for handling different seed. This simple method of changing the seed plate will permit the farm operator to make the changes as required in the field in a matter of minutes without having to return to his shop or call in the services of a trained mechanic. Beyond the pillow block 111, the shaft 5 is equipped with a sprocket 118 which is driven by a chain 119 to rotate the spoke wheel 7 at the desired speed to cause the tangential speed of the tip 15 of any spoke 12 which is in the opposite direction to the said speed of the planter to be equal or less than the planter speed so that the individual seed S will drop vertically straight down or slightly forward when they pass end 14 of rim 13 and not strow behind the planter as would be the case if spoke tip 15 when it passes over end 14 is moving at a higher rate of speed than the forward speed of the planter. In actual practice it has been found that some seed have a tendency to tumble or to drag excessively or unevenly when passing down along the surface 16 of rim 13. Either of these actions may cause the seed S to bounce or scatter slightly when they strike the ground. To overcome this tendency the tip 15 of spoke 12 has been modified in one embodiment to be square in cross section and be provided with hinged doors 120 as shown in FIGURES 18-20. Pins 121 extend in a front and rear direction through the square spoke tip 15' and doors 120 are pivoted thereto. The seed S in the embodiment does not slide or drag along the rim 13 but is carried at rest on the closed top side of doors 120 when the spoke 12' is rotating downward. The bottom side of the doors 120 does drag on rim 13 until they pass end 14, whereupon they fall open due to gravity and permit seed S to drop straight down to the seed hill in row R in a very accurate manner (FIGURE 19). The doors 120 remain open until the spoke 12' has rotated to the vicinity of triangular wing guides 122 (FIGURE 1) whereupon the guides force the doors closed and they remain closed and in contact with surface 16 until they again pass end 14.

Figure 13:
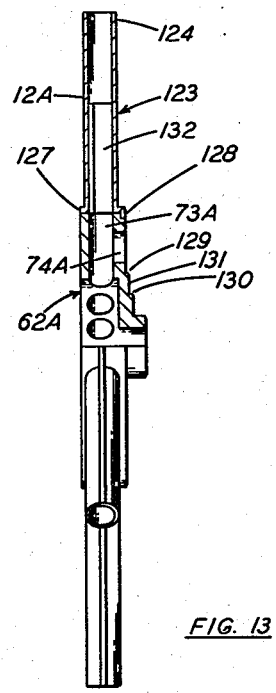
FIGURE 13 is a half-section view of the device of FIGURE 11.
Figure 12:
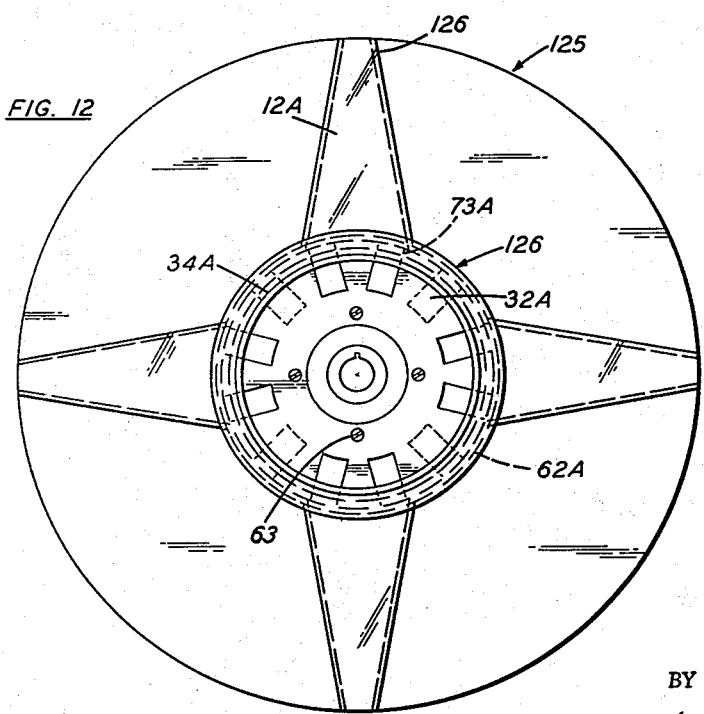
FIGURE 12 is a further variation of the embodiment shown in FIGURE 11.

With certain type seeds it may be desirable to change the seed hill spacing in a crop row or change the quantity of seed deposited in each seed hill, and to accomplish these purposes a spoke adapter 123 (FIGURES 11, 13) is provided which will channel the seed output of two spoke fittings 73A into a single spoke tip 124. It will be apparent that by employing the adapter 123 of FIGURE 11 the quantity of seed S emerging from each tip 124 will be doubled, and since there are only one-half as many spokes that the distance between seed hills will also be doubled (12"). This quantity and spacing may both be varied by other combinations such as the modified embodiment 125 shown in FIGURE 12 wherein only eight out of the twelve available spoke fittings 73A are employed to provide four spoke tips 126; and also in the seed plate 126 of this embodiment, every third opening 32A is blanked out. By this arrangement two seeds (or double the basic quantity if other than one) will be deposited in a crop row at 18-inch hill spacings. Other spacing combinations may be obtained by using only two pair of openings 32 for 26-inch spacing and only one pair of openings for 72-inch spacing. The spoke hub, identified at 62A in FIGURES 11-13 is very similar to hub 62 of FIGURE 5, and may be used interchangeably therewith when hub 62A is equipped with a single seed spoke adapter (not shown). The adapters 123 and 125 in this embodiment are made of sheet metal and are made in one integral piece to permit ready removal and replacement on hub 62A by simply sliding the adapter 123 to the right (FIGURE 13) so that its left end 127 simply slides laterally across the circumference of hub 62A and its right end 128 moves away from its recess engagement in the face of the hub. The first ridge 129 permits the back-up plate 20 to have sliding contact and be centered in the metering plate assembly, and the second ridge 130 centers the seed plate 21 which is attached by screws 63 to the threaded holes 64 in the land 131 between the ridges. A guide plate or angle 132 braces and divides the interior of the spoke legs 12A which legs taper to enclose two cavities 74A at the hub.

In view of the foregoing disclosure it will be observed that there has been produced an extremely simple and yet exceedingly effective metering device and in the embodiment shown, a precision seed planter in which a single seed is channeled by means of a guide ring into a position to be attracted by a suction port on a revolving plate; the seed being held by suction against a small stop and in sliding relation to a stationary plate as the first plate revolves until a second suction is employed to remove it from the stop just as the first suction is shut off and deposit it in a spoke wheel for planting at accurate intervals.

U.S. Patent 2,783,918, granted March 5, 1957 is hereby referenced and made a part of the instant specification for the purposes of disclosure of conventional matter, although nothing claimed in this granted patent is intended to be claimed herein.

From the foregoing description it will be readily seen that there has been produced a device which substantially fulfills the objects of the invention as set forth herein. The invention is not limited to the exemplary constructions herein shown and described, but may be made in many ways within the scope of the appended claims.

What is claimed is:

1. A metering device by which a predetermined quantity of similarly shaped objects may be removed from a bulk supply of such objects and may be deposited in said quantity at another location, comprising: a metering assembly including a rotating element and a stationary element supporting said rotating element for rotary movement, a suction source operatively connected with said metering assembly, means on said assembly to apply suction from said source to said bulk supply to attract and hold said predetermined quantity of said objects against said rotating element and a second means to apply suction to the quantity of objects held on said rotating element in a manner to remove said objects at said other location.

2. A metering device by which a single object may be removed from a bulk supply of similarly shaped objects and may be deposited at another location, comprising: a metering plate assembly, a portion of said plate assembly being in contact with said bulk supply, a suction source operatively connected with said assembly, means on said assembly to apply suction from said source to said bulk supply to attract and hold said object against said portion of said plate assembly, a means to move said portion out of contact with said bulk supply and a second means to apply a greater suction to the held object to remove said object from said plate assembly at said other location.

3. A metering device by which individual items may be removed from a bulk supply and may be deposited at another location, comprising: a metering assembly, including a rotating element and a stationary element adjacent said rotating element, both said elements having openings therethrough, a suction source operatively connected with said assembly, means on said assembly to apply suction from said source to said bulk supply to attract and hold said individual items against one side of said assembly, and a second means to apply suction to said held items to cause them to move through said openings and be deposited at said other location.

4. In a metering device by which individual items may be removed from a bulk supply and may be deposited at another location, a metering plate comprising: a flat member having at least one opening therein, an upstanding member attached to said flat member in the vicinity of said opening, a port in said upstanding member near said opening, and an item stop attached to said plate in cooperative relation to both said port and said opening said port being smaller in size than the items to be removed from said bulk supply.

5. In a metering device by which individual items may be removed from a bulk supply and may be deposited to another location, a metering plate assembly comprising: a stationary annular air ring, a suction source in said air ring, a back-up plate attached to said ring at a spaced distance therefrom, a rotary metering plate interposed in operating relation between said ring and said back-up plate and in abutting proximity to said bulk supply, an opening in said back-up plate at said other location, a cutout in said metering plate, an air port in said metering plate, said air port being smaller than said item, means to rotate said plate, and means to apply suction from said ring to said ports to attract said items to be held against said metering plate at said opening while said metering plate rotates, and a second suction source operating through said back-up plate opening and adapted to move said item from its held position to said other location when said metering plate opening has moved into coincidence with said back-up plate opening.

6. In a metering device as in the next preceding claim an arcuate loading ring attached to said air ring and held therefrom in concentric relation to both said air ring and said metering plate and spaced laterally from the metering plate by a distance slightly in excess of the width of said individual items, said loading ring and plate assembly extending a substantial distance into said supply source, said loading ring acting as a guide to align said individual items with said air ports while said metering plate is rotating.

7. A metering device as in the next preceding claim said back-up plate and its attached air ring extending substantial distance into said bulk supply and characterized by the inclusion of a vibrator attached to said back-up plate for the purpose of agitating said items into entrance into that lateral space between said guide ring and said metering plate.

8. In a metering device as in claim 6, an air pressure source in said air ring, and means to apply air pressure from said ring directly into said metering ring ports prior to the application of suction to said ports for the purpose of clearing said ports.

9. A metering device by which individual items may be removed from a bulk supply and may be deposited at another location, comprising: a frame, a metering plate assembly supported from said frame and including a rotating and a stationary element, a generally hollow rotary spoke wheel on said frame and rotating adjacent said metering plate assembly, a suction source operatively connected with said metering plate assembly, a pressure source operatively connected with said spoke wheel, means on said plate assembly to apply suction from said source to said bulk supply to attract and hold said individual items against said rotating element, said rotating element, said stationary element and said spoke wheel each defining an opening capable of alignment with the other openings, and a second means to apply suction to the quantity of items held on said assembly to transfer said items into the hollow section of said spoke wheel through said aligned openings, and means to apply pressure from said source to said spoke wheel to assist in discharging said items from said spoke wheel.

10. A metering device as in claim 9 wherein said last named means comprises a spider ring having a pair of air cavities therein, said air pressure source being connected to one end of one of said cavities and said suction source being connected to one end of the other said cavity, and said spoke wheel being operatively connected to the other end of said cavities.

11. In a metering device by which individual items may be removed from a bulk supply and may be deposited at another location, a spoke wheel hub to receive said deposited items, comprising a circular integral casting having a central circular ridge surrounding a counterbore, fittings on said hub radiating from said ridge to the periphery of said casting, securing means at the peripheral end of said fittings to receive hollow spokes, a channel extending from said securing means to said ridge and opening into said counterbore, a pocket extending transversely to said channel intermediate of its length and opening to one side of said casting only, said pocket being adapted to receive said deposited items, and said channel being adapted to provide egress of said items from said pocket to said hollow spoke for ultimate discharge therefrom.

12. A seed planter for planting a precise quantity of individual seed in accurately spaced locations, comprising: a spoke wheel defining an opening therein to receive deposited seed therein and to discharge said seed for planting, a metering assembly defining a passageway therethrough and cooperating with said spoke wheel to deposit seed therein, a seed supply source adjacent to one side of said metering assembly, said spoke wheel being adjacent to the other side of said assembly, and suction means to move individual items from said supply source through the passageway in said metering assembly and into said spoke wheel opening.

13. In a metering device including a rotating spoke wheel having an air channel opening into an axial counterbore and a stationary spider having a circular spider ring of a corresponding diameter to said counterbore; an air cavity in said spider opening to the periphery of said spider ring, and a mesh ring installed in said counterbore to rotate with said spoke wheel whereby said spider air cavity opening will be exposed to the entire circumference of said mesh ring during each revolution of said wheel.

14. In a metering device by which selected items may be removed from a bulk supply, a metering assembly including an opening smaller than the items to be removed, a suction source in operative connection with one side of said opening to attract an item from said bulk supply, and a super atmospheric pressure air source closely adjacent the other side of said opening to provide a greater pressure differential to the opposite sides of said item than would be available at ordinary atmospheric pressures to thus increase the holding force on said item during the metering operation.

15. In a metering device for metering a selected quantity of individual items from a bulk supply including a rotary wheel having a hub with a series of radial discharge channels about the periphery of said hub and wheel, metering means to place individual items in said wheel discharge channels, pressure means to discharge said items from said channels, means to convert the said radial discharge of said items from said wheel into a linear deposit of said items along a surface, power means for rotating said wheel at a predetermined speed to provide a uniform spacing between said deposited items, and adapter means to combine the output of more than one channel in such a way as to selectively vary both the quantity of items deposited and their linear spacing.

References Cited in the file of this patent

UNITED STATES PATENTS

| | | |
|---|---|---|
| 711,996 | Moore | Oct. 28, 1902 |
| 1,046,199 | Knopp | Dec. 3, 1912 |
| 1,331,235 | Bristow | Feb. 17, 1920 |
| 2,783,918 | Bramblett | Mar. 5, 1957 |
| 2,903,156 | Eddison | Sept. 8, 1959 |